Oct. 24, 1933. W. L. ADAMS 1,932,360
FISHING REEL
Filed April 12, 1932 2 Sheets-Sheet 2
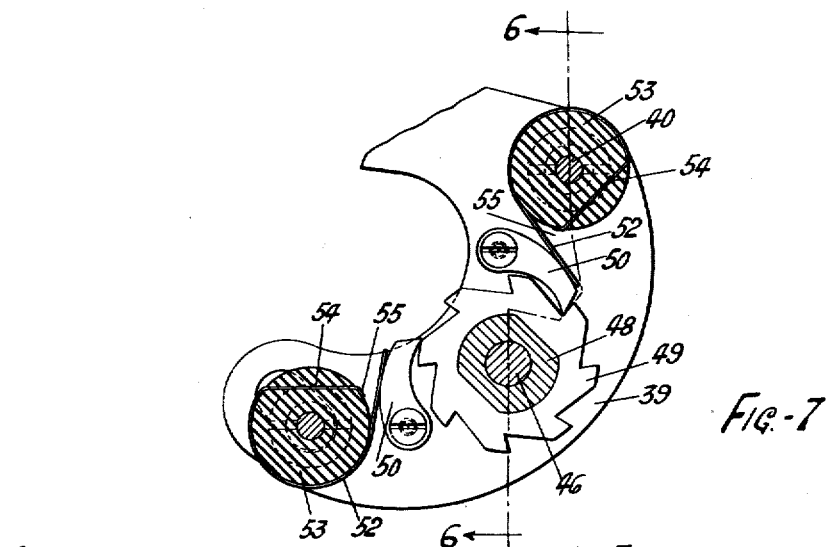
FIG.-7
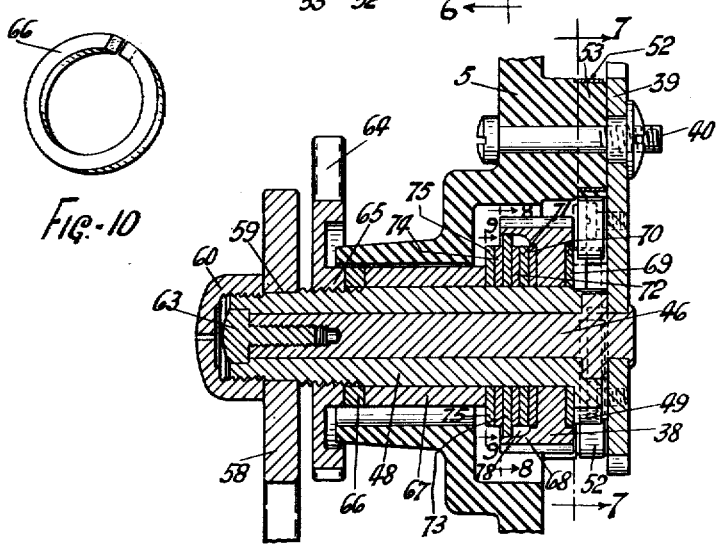
FIG.-10
FIG.-6
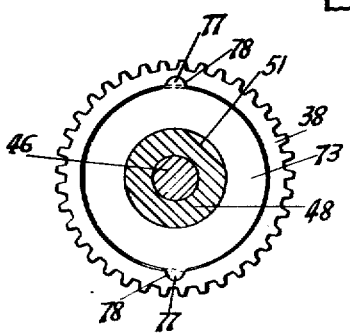
FIG.-8
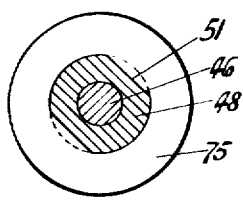
FIG.-9
INVENTOR
WALTER L. ADAMS
BY
ATTORNEYS Patented Oct. 24, 1933

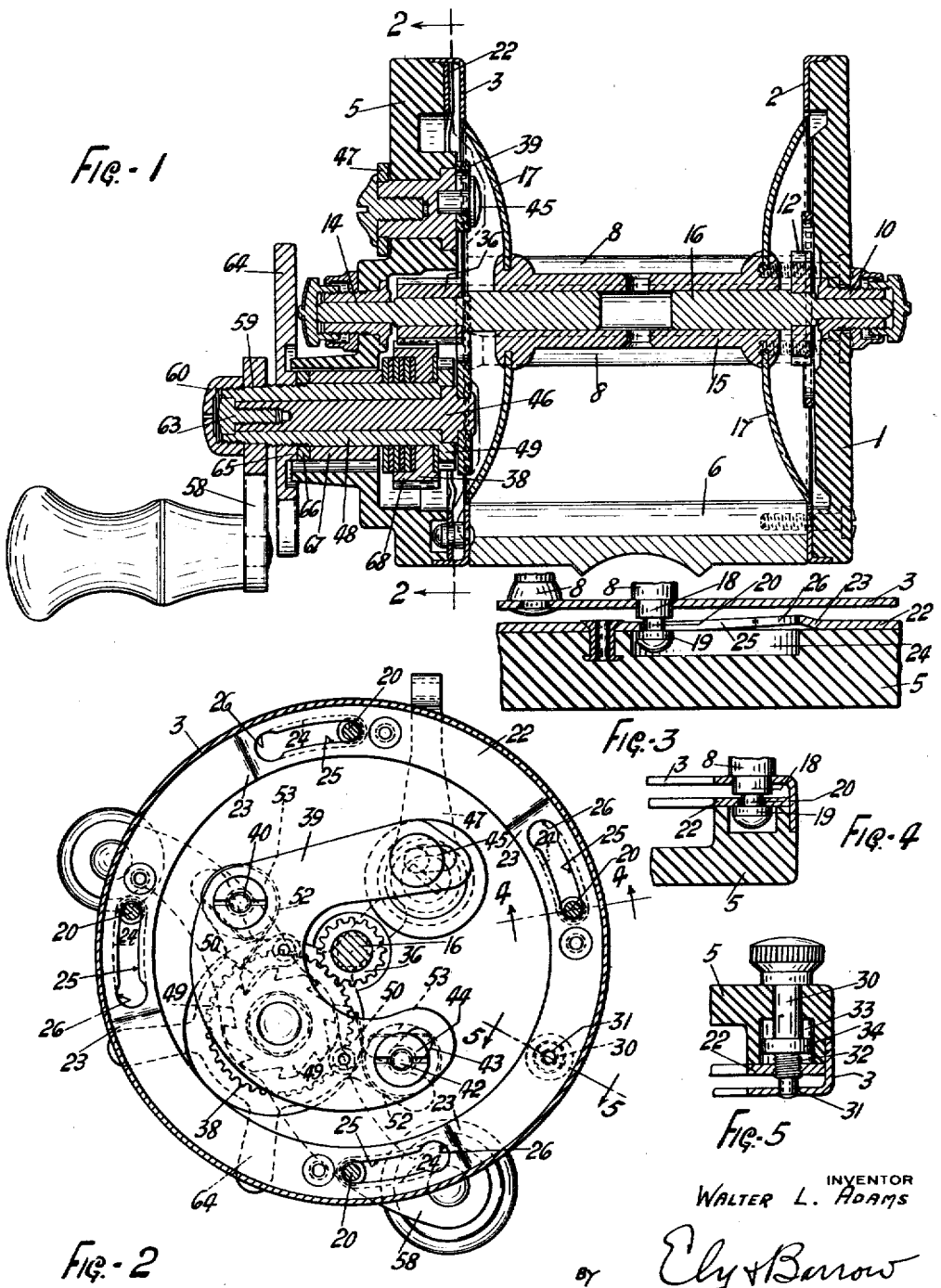

1,932,360

UNITED STATES PATENT OFFICE 1,932,360

FISHING REEL

Walter L. Adams, Akron, Ohio, assignor to The Enterprise Manufacturing Company, Akron, Ohio, a corporation of Ohio Application April 12, 1932. Serial No. 604,698

11 Claims. (Cl. 242—84.5)

The present invention relates to fishing reels and particularly to the larger types of fishing reels usually employed in salt water fishing.

Several new and useful purposes are accomplished by the invention here illustrated and described, among which may be noted the perfection of a simple and efficient form of reel having so-called "take-apart" features, that is to say, the reel is constructed and designed so that one of the end plates, and particularly the front plate, is readily removable from the balance of the reel structure so that the operating mechanism on the front plate is exposed for cleaning and repairing and the reel spool may be taken out of the framework for access to the bearing and the click mechanism carried upon the rear plate.

It is also one of the purposes of the invention to improve upon the drag handle mechanism by means of which the free rotation of the spool in the unwinding of the line is retarded. The new and improved form of drag handle is simpler and more effective than previous designs for this purpose.

One of the principal features of the new drag handle mechanism is the means by which a greater friction surface is obtained in a very small area by reason of multiple disk friction means associated with the gear. Heretofore, all reels of similar type have been provided with only two friction washers in contact with the gear. By the improved mechanism shown and described herein, it is possible to add a greater number of friction washers to the drag mechanism and thereby obtain superior braking results without increasing the size of the gear.

Other objects and advantages will be apparent from the detailed description of the reel structure, it being evident to those skilled in the art, that changes and modifications may be made in the particular design and arrangement of parts without departing from the essential features of the invention as set forth in the claims hereof.

In the drawings in which the best known or preferred form of the invention is illustrated:—

Figure 1 is a longitudinal cross section of the reel structure taken along the spool shaft;

Figure 2 is a section on the line 2—2 of Figure 1, looking at the under side of the front plate;

Figure 3 is an enlarged detail of one of the locking posts by which the front plate is held upon the reel structure;

Figure 4 is a cross section on the line 4—4 of Figure 2;

Figure 5 is a cross section through the locking pin on the line 5—5 of Figure 2;

Figure 6 is an enlarged longitudinal section along the crank shaft showing the details of the drag handle, on the line 6—6 of Figure 7;

Figure 7 is a section on the line 7—7 of Figure 6 showing the improved pawl construction of the drag handle;

Figure 8 is a detail on the line 8—8 of Figure 6;

Figure 9 is a detail on the line 9—9 of Figure 6; and

Figure 10 is a detail of the split washer between the adjusting device and the drag mechanism.

The reel comprises a main housing or cage which constitutes the framework in which the spool is mounted and to which the front plate is removably attached. The housing is formed from a back plate 1, preferably made of hard rubber, bakelite, or similar material about which is mounted the flanged binding and reinforcing ring 2 enclosing the edge of the back plate and extending over the inner face thereof. The rear plate is connected to the angular ring 3 which is adapted to receive the front plate 5, also made of hard rubber or bakelite. The ring 3 and the rear plate are connected by the pillars 8 and by the cross plate 6 as is usual in reel constructions, but in the particular form shown the pillars 8 are grouped in pairs on either side of the reel structure so as to leave the portion of the cage opposite the cross plate free and unobstructed for manipulation of the line. On the rear plate is supported the central bearing 10 for the spool shaft and the usual click mechanism 12.

On the front plate 5 is carried the bearing 14 for the spool shaft and the crank and spool-driving mechanism. The spool is indicated by the numeral 15 and the spool shaft, which may be divided as shown in Figure 1, by the numeral 16. The spool flanges 17 lie within and are protected by the rings 2 and 3, the latter allowing free withdrawal of the spool endwise of the reel after the front plate is removed.

On the surface of the ring 3 adjacent the inner face of the outer plate 5 are arranged a plurality of pins or studs 18 spaced about the ring and provided with heads 19 and reduced shanks 20. The studs may be formed as continuations of certain of the pillars 8, or they may be separate pins riveted in position upon the ring. In the specific case shown, two of the studs are formed as parts of the pillars and two as separate members.

On the inner face of the front plate is secured the locking ring 22 which is formed with a number of struck-up portions 23 equal to the studs and overlying recesses 24 in the plate. The portions 23 are inclined or cammed as shown in Figure 3 and in the ring 22 at these points are formed slots 25 having enlarged openings 26 at one end through which the heads of the studs may pass, the narrow portions of the slots engaging the reduced shanks when the front plate is rotated to locking position. The openings 26 are formed in the high portions of the ring so that as the front plate is rotated to locked position the assembly will bind and draw the front plate into close engagement with its seat. In order to prevent accidental rotation of the front plate, a locking means is provided. For this purpose the plate is provided with a locking pin which is extended to engage a recess or opening 31 in the ring 3 when the ring is in locked position. The pin 30 is provided with a short screw-threaded section 32 which engages the ring 22, and the front plate is formed with a recess 33 in which moves the flange 34 formed on the pin so that the latter cannot be accidently removed from the front plate.

It will be observed that an extremely simple and yet effective means has been provided whereby the front plate may readily be assembled or disassembled from the reel structure, and when lifted off the spool is removable through the opening in the ring 3 and the whole reel structure is thereby easily taken apart. In reassembling, after the spool shaft has been properly entered in its bearings, the front plate is located so that the holes 26 align with the studs, whereupon the front plate is pressed inwardly until the studs enter the slots, and then rotated about the shaft into locking position. As the front plate moves in the manner described it is drawn into close engagement with the reel cage. When in fully seated position the pin 30 is moved inwardly into locking position.

A pinion 36 is secured to the spool shaft and is adapted to mesh with the driving gear 38 when the latter is moved into operating position. The gear 38 is, for this purpose, carried upon the angular bridge piece 39, pivotally mounted at 40 on the front plate. Means on one side of the pivot 40 for holding the bridge piece against the front plate at all times is provided by the screw or bolt 42 which passes through slot 43 in the bridge piece and carries the nut 44. On the other side of the pivot the bridge piece is held down by means of the headed pin 45 on the bridge piece shifting lever 47, the shank of which passes through a slot in the part 39. On the bridge piece is carried the crank shaft post 46 upon which is rotatably mounted the tubular shaft 48 upon which the gear 38 is mounted. The sides of the shaft are flattened as shown at 51 in Figures 8 and 9. The end of the shaft 48 is formed with the ratchet 49 adapted to be engaged by the oppositely located pawls 50 which are pivotally mounted on the bridge piece. Each of the pawls is pressed against the ratchet by a leaf spring 52, which surrounds a circular boss or projection 53 formed on the end plate 5. The end of the spring remote from the pawl is received in a slot 54 formed in the boss, the tip of the spring being bent over as shown at 55. The bridge piece 39 overlies the two bosses 53 and thereby holds the springs in place. The springs are thus effectively mounted and may be easily removed by detaching the bridge piece. This also facilitates and improves upon the mounting of the springs.

When the drag handle is used to retard the rotation of the spool, the gears 36 and 38 are in mesh. The gear 38 is movable about the tubular shaft 48, but is frictionally held thereon so that its free movement is retarded at the will of the operator and to the degree determined by the adjustment of the drag mechanism which will be described. The backward rotation of the shaft 48 is prevented by the pawl and ratchet mechanism shown in Figure 7.

The tubular shaft is provided at its outer end with the crank handle 58 non-rotatably mounted on the square end 59 of the shaft by the cap nut 60. The shaft is held in position upon the post 46 by means of the screw 63 which is accessible when the cap nut 60 is removed. Immediately below the crank handle, the shaft 48 is screw-threaded for a short distance for engagement with the star wheel 64 by which the adjustment of the drag mechanism is secured. In the rear of the star wheel and in contact with a central boss 65 thereof, is a split washer 66 which bears upon a pressure sleeve 67 movable over the shaft. The washer is preferably a split spring locking washer which, acting as a tension device, prevents the star wheel from working loose from its set position. The inner end of the sleeve bears against the friction drag device which will now be described and compacts or compresses the friction unit.

The gear 38 is provided upon its under face with a shallow recess in which is placed a thin fibre disk friction washer 69 interposed between that face of the gear and the enlarged base of the tubular shaft. The outer face of the gear is provided with a flange 68 in which is received a series of metal and fibre friction disks. The several disks are numbered 70 to 75 inclusive, the disks 70, 72 and 74 being fibre washers provided with circular central apertures so as to be rotatable about the shaft 48. The washers 71 and 75 are metal disks which are provided with flattened openings as shown in Figure 9 so that they are locked to the shaft 48. The washer 73 is also a metal disk, but this disk is provided with the round central opening shown in Figure 8 and with oppositely projecting ears or lugs 77 which project into longitudinal grooves or keyways 78 cut on the inner annular surface of the gear flange 68 so as to interlock therewith although being capable of shifting movement therein in response to the adjustment of the drag mechanism.

It will be seen that an extremely compact and efficient drag mechanism has been provided. As the gear 38 tends to rotate under the influence of the unwinding line the disk 73 will rotate with it. The fibre disks 69 and 70 will tend to rotate with the gear due to their contacts with the opposite faces thereof, but the disk 69 will be restrained by contact with the base of the tubular shaft 48 and the disk 70 will be restrained by its contact with the metal disk 71 which is keyed to the shaft. The rotation of the disk 73 will be restrained by the fibre disks 72 and 74 upon either side thereof which are in contact with the keyed metal disks 71 and 75. The gear and the several disks constitute a pile of retarding or restraining elements against the free rotation of the gear, which is adjustable as to its effectiveness and degree by the rotation of the adjusting star wheel 64. Four fibre disks acts against the surface of the gear and the disk 73 which is keyed thereto, and these disks each in turn is in opposing contact with the tubular shaft or the non-rotating disks carried thereon.

The several features of the invention are subject to modifications or variations within the skill of the reel designer and it is not the intention to limit the protection of the application beyond the fair scope thereof as determined by the prior art or set forth in the substance of the claims.

What is claimed is:—

1. A reel structure comprising a framework for housing a spool, said framework comprising one end plate, pillars and a ring connected therewith, a plurality of headed pins on the ring, a second end plate receivable over the ring, a second ring secured to the inner face of the last-named plate, and a plurality of arc-shaped slots in the face of the second ring having portions to receive the headed pins and portions to interlock therewith upon rotation of the end plate.

2. A reel structure comprising a framework for housing a spool, said framework comprising a stationary ring through which the spool may be removed, a plurality of headed pins projecting from the ring, an end plate, and a ring attached to the face of the end plate, said last-named ring having a plurality of slots engageable with the pins and movable into locking position by rotation of the end plate, the portions of the ring bearing the slots being cammed to draw the end plate into tight engagement with the framework.

3. A reel structure comprising a framework for housing a spool, said framework comprising a stationary ring through which the spool may be removed, a plurality of headed pins projecting from the ring, an end plate, a ring attached to the inner face of the end plate, said last-named ring having a plurality of slots engageable with the pins and movable into locking position by rotation of the end plate, and a locking pin having a limited range of movement and engageable with a recess in the framework.

4. A reel structure comprising a framework for housing a spool, said framework comprising a stationary ring through which the spool may be removed, a plurality of headed pins projecting from the ring, an end plate, a ring attached to the inner face of the end plate, said last-named ring having a plurality of slots engageable with the pins and movable into locking position by rotation of the end plate, the portions of the ring bearing the slots being cammed to draw the end plate into tight engagement with the framework, and a locking pin having a limited range of movement and engageable with a recess in the framework.

5. A reel structure including an end plate and a drag handle mechanism, said mechanism including a gear and operating crank, a bridge piece on the plate for supporting the drag, a ratchet and pawl associated with the gear, a spring for actuating the pawl, and a boss on the end plate having a slot therein to receive the spring, the bridge piece overlying the boss to retain the spring in position.

6. A reel including a friction drag mechanism for the spool, comprising a driving gear, an operating shaft for the gear, and friction means to retard the rotation of the gear about the shaft comprising alternate friction and metal disks upon the shaft, certain of said metal disks having non-rotative engagement with the shaft and one of said metal disks having a feathered engagement with the gear and means for compacting the several disks to varying degrees.

7. In a reel structure, a frictional drag mechanism for the spool, comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, and means for compacting the drag mechanism.

8. In a reel structure, a frictional drag mechanism for the spool, comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, a second metal disk having non-rotative engagement with the shaft on the opposite side of the feathered disk, a friction washer interposed therebetween, and means for compacting the drag mechanism.

9. In a reel structure, a frictional drag mechanism for the spool comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, a second metal disk having non-rotative engagement with the shaft on the opposite side of the feathered disk, a friction washer interposed therebetween, a friction washer on the opposite face of the gear, and means for compacting the drag mechanism.

10. In a drag mechanism for a fishing reel, a gear for driving engagement with the spool, the gear having a flange, a disk having feathered engagement with the gear flange, friction members between the disk and the gear, a drive shaft rotatable in the gear and having non-rotative engagement with one of said friction members, and means to compress the drag mechanism.

11. In a drag mechanism for fishing reels, a drive shaft, a gear on the shaft, and means for frictionally connecting the gear and the shaft, comprising a member non-rotatively connected to the gear but movable on the shaft toward and from the gear, a friction disk and fibre washers between the member and the gear, the friction disk having non-rotative connection with the shaft, and means to compact the friction disk and washers.

WALTER L. ADAMS.

DISCLAIMER 1,932,360.—*Walter L. Adams*, Akron, Ohio. FISHING REEL. Patent dated October 24, 1933. Disclaimer filed September 29, 1939, by the assignee, *The Enterprise Manufacturing Company*.

Hereby enters this disclaimer to claims 6 to 11, inclusive, of the specification.

[*Official Gazette October 24, 1939*.]

tubular shaft or the non-rotating disks carried thereon.

The several features of the invention are subject to modifications or variations within the skill of the reel designer and it is not the intention to limit the protection of the application beyond the fair scope thereof as determined by the prior art or set forth in the substance of the claims.

What is claimed is:—

1. A reel structure comprising a framework for housing a spool, said framework comprising one end plate, pillars and a ring connected therewith, a plurality of headed pins on the ring, a second end plate receivable over the ring, a second ring secured to the inner face of the last-named plate, and a plurality of arc-shaped slots in the face of the second ring having portions to receive the headed pins and portions to interlock therewith upon rotation of the end plate.

2. A reel structure comprising a framework for housing a spool, said framework comprising a stationary ring through which the spool may be removed, a plurality of headed pins projecting from the ring, an end plate, and a ring attached to the face of the end plate, said last-named ring having a plurality of slots engageable with the pins and movable into locking position by rotation of the end plate, the portions of the ring bearing the slots being cammed to draw the end plate into tight engagement with the framework.

3. A reel structure comprising a framework for housing a spool, said framework comprising a stationary ring through which the spool may be removed, a plurality of headed pins projecting from the ring, an end plate, a ring attached to the inner face of the end plate, said last-named ring having a plurality of slots engageable with the pins and movable into locking position by rotation of the end plate, and a locking pin having a limited range of movement and engageable with a recess in the framework.

4. A reel structure comprising a framework for housing a spool, said framework comprising a stationary ring through which the spool may be removed, a plurality of headed pins projecting from the ring, an end plate, a ring attached to the inner face of the end plate, said last-named ring having a plurality of slots engageable with the pins and movable into locking position by rotation of the end plate, the portions of the ring bearing the slots being cammed to draw the end plate into tight engagement with the framework, and a locking pin having a limited range of movement and engageable with a recess in the framework.

5. A reel structure including an end plate and a drag handle mechanism, said mechanism including a gear and operating crank, a bridge piece on the plate for supporting the drag, a ratchet and pawl associated with the gear, a spring for actuating the pawl, and a boss on the end plate having a slot therein to receive the spring, the bridge piece overlying the boss to retain the spring in position.

6. A reel including a friction drag mechanism for the spool, comprising a driving gear, an operating shaft for the gear, and friction means to retard the rotation of the gear about the shaft comprising alternate friction and metal disks upon the shaft, certain of said metal disks having non-rotative engagement with the shaft and one of said metal disks having a feathered engagement with the gear and means for compacting the several disks to varying degrees.

7. In a reel structure, a frictional drag mechanism for the spool, comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, and means for compacting the drag mechanism.

8. In a reel structure, a frictional drag mechanism for the spool, comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, a second metal disk having non-rotative engagement with the shaft on the opposite side of the feathered disk, a friction washer interposed therebetween, and means for compacting the drag mechanism.

9. In a reel structure, a frictional drag mechanism for the spool comprising a driving gear, an operating shaft for the gear, the gear being rotatable about the shaft, a metal disk rotatable about the shaft but feathered to the gear, a metal disk interposed between the feathered disk and the gear and having non-rotative engagement with the shaft, friction washers on opposite sides of the interposed metal disk, a second metal disk having non-rotative engagement with the shaft on the opposite side of the feathered disk, a friction washer interposed therebetween, a friction washer on the opposite face of the gear, and means for compacting the drag mechanism.

10. In a drag mechanism for a fishing reel, a gear for driving engagement with the spool, the gear having a flange, a disk having feathered engagement with the gear flange, friction members between the disk and the gear, a drive shaft rotatable in the gear and having non-rotative engagement with one of said friction members, and means to compress the drag mechanism.

11. In a drag mechanism for fishing reels, a drive shaft, a gear on the shaft, and means for frictionally connecting the gear and the shaft, comprising a member non-rotatively connected to the gear but movable on the shaft toward and from the gear, a friction disk and fibre washers between the member and the gear, the friction disk having non-rotative connection with the shaft, and means to compact the friction disk and washers.

WALTER L. ADAMS.

DISCLAIMER 1,932,360.—*Walter L. Adams*, Akron, Ohio. FISHING REEL. Patent dated October 24, 1933. Disclaimer filed September 29, 1939, by the assignee, *The Enterprise Manufacturing Company*.

Hereby enters this disclaimer to claims 6 to 11, inclusive, of the specification.

[*Official Gazette October 24, 1939.*]

DISCLAIMER 1,932,360.—*Walter L. Adams*, Akron, Ohio. FISHING REEL. Patent dated October 24, 1933. Disclaimer filed September 29, 1939, by the assignee, *The Enterprise Manufacturing Company*.

Hereby enters this disclaimer to claims 6 to 11, inclusive, of the specification.

[*Official Gazette October 24, 1939.*]